US012746583B2

(12) United States Patent
Lindsey et al.

(10) Patent No.: US 12,746,583 B2
(45) Date of Patent: Sep. 29, 2026

(54) CLOSET AUGER

(71) Applicant: MILWAUKEE ELECTRIC TOOL CORPORATION, Brookfield, WI (US)

(72) Inventors: Jacob K. Lindsey, Milwaukee, WI (US); Steven J. Berg, Jr., Wauwatosa, WI (US); Justin D. Miller, Richfield, WI (US); Terry L. Timmons, Oconomowoc, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 486 days.

(21) Appl. No.: 18/207,388

(22) Filed: Jun. 8, 2023

(65) Prior Publication Data

US 2023/0398585 A1 Dec. 14, 2023

Related U.S. Application Data

(60) Provisional application No. 63/350,143, filed on Jun. 8, 2022.

(51) Int. Cl.

| | |
|---|---|
| ***B08B 9/04*** | (2006.01) |
| ***B08B 9/045*** | (2006.01) |
| ***B08B 9/047*** | (2006.01) |
| *E03C 1/302* | (2006.01) |

(52) U.S. Cl.

CPC .............. *B08B 9/045* (2013.01); *B08B 9/047* (2013.01); *B08B 2209/04* (2013.01); *E03C 1/302* (2013.01)

(58) Field of Classification Search

CPC .......... E03C 1/302; B08B 9/045; B08B 9/047

See application file for complete search history.

(56) References Cited

U.S. PATENT DOCUMENTS

| | | | |
|---|---|---|---|
| 2,244,735 | A | 6/1941 | Silverman |
| 2,779,041 | A | 1/1957 | Silverman |
| 2,961,675 | A | 11/1960 | Stickney |
| 3,121,244 | A | 2/1964 | Hunt |
| 3,246,354 | A | 4/1966 | Cooney et al. |
| 3,691,583 | A | 9/1972 | Silverman et al. |
| 3,897,602 | A | 8/1975 | Waterbury |
| 4,364,140 | A | 12/1982 | Irwin |
| 4,617,693 | A | 10/1986 | Meyer et al. |
| 4,763,374 | A | 8/1988 | Kaye |
| 4,773,115 | A | 9/1988 | Smith |

(Continued)

FOREIGN PATENT DOCUMENTS

| | | | |
|---|---|---|---|
| DE | 29910343 | U1 | 9/1999 |
| DE | 102018115680 | B3 | 10/2019 |
| WO | 2006112847 | A1 | 10/2006 |

*Primary Examiner* — Michael D Jennings

(74) *Attorney, Agent, or Firm* — Michael Best & Friedrich LLP

(57) ABSTRACT

A closet auger includes a casing member extending along an axis and a drive member telescopically received in the casing member and moveable between an extended position and a retracted position relative to the casing member along the axis. The drive member includes a first end and a second end opposite the first end. The first end having an expanded portion that expands away from a remainder of the drive member. The expanded portion configured to contact the casing member and limit the axial movement of the drive member. The closet auger also includes a flexible cable removably connectable to the drive member.

21 Claims, 17 Drawing Sheets

(56) References Cited

U.S. PATENT DOCUMENTS

| | | | |
|---|---|---|---|
| 4,956,889 | A | 9/1990 | Kirk |
| 5,018,234 | A | 5/1991 | Meyer et al. |
| 5,230,116 | A | 7/1993 | Rodriguez |
| 5,414,888 | A | 5/1995 | Irwin |
| 5,901,401 | A | 5/1999 | Rutkowski et al. |
| 5,987,684 | A | 11/1999 | Evans |
| 6,158,076 | A | 12/2000 | Rutkowski et al. |
| 6,343,398 | B1 | 2/2002 | Silverman et al. |
| 6,421,871 | B1 | 7/2002 | Peach et al. |
| 6,470,525 | B1 | 10/2002 | Silverman |
| 6,615,436 | B1 | 9/2003 | Burch, Jr. et al. |
| 6,637,064 | B2 | 10/2003 | Silverman et al. |
| 7,367,077 | B2 | 5/2008 | Rutkowski et al. |
| 7,526,827 | B1 | 5/2009 | Bitterman |
| 7,685,669 | B2 | 3/2010 | Rutkowski et al. |
| 7,889,980 | B2 | 2/2011 | Sooy |
| 8,434,186 | B2 | 5/2013 | Wildauer et al. |
| 8,826,483 | B2 | 9/2014 | Rutkowski et al. |
| 10,443,225 | B2 | 10/2019 | Hoyt |
| 10,465,372 | B2 | 11/2019 | Bowles et al. |
| 10,486,207 | B2 | 11/2019 | Kehoe et al. |
| 10,570,596 | B1 | 2/2020 | Schneck et al. |
| 10,987,708 | B2 | 4/2021 | Szucs et al. |
| 11,185,898 | B2 | 11/2021 | Kehoe et al. |
| 2008/0098544 | A1 | 5/2008 | Rutkowski et al. |
| 2008/0148503 | A1 | 6/2008 | Babb et al. |
| 2008/0244816 | A1 | 10/2008 | Babb et al. |
| 2013/0160227 | A1 | 6/2013 | Rutkowski et al. |
| 2014/0223679 | A1 | 8/2014 | Silverman et al. |
| 2015/0113748 | A1 | 4/2015 | Rutkowski et al. |
| 2017/0232484 | A1* | 8/2017 | Kehoe .................... B08B 9/045 15/104.095 |
| 2017/0268596 | A1* | 9/2017 | Cole ...................... F16F 15/04 |
| 2018/0016776 | A1* | 1/2018 | Stoneback .............. E03F 9/005 |
| 2018/0126429 | A1* | 5/2018 | Banholzer ............... E03F 9/005 |
| 2019/0193128 | A1* | 6/2019 | Banholzer ............... E03F 9/005 |
| 2020/0047223 | A1* | 2/2020 | Kehoe ...................... E03D 9/00 |
| 2020/0080293 | A1 | 3/2020 | Krohlow |
| 2021/0159818 | A1 | 5/2021 | Moghe et al. |
| 2021/0172162 | A1 | 6/2021 | Cole et al. |
| 2021/0205863 | A1 | 7/2021 | Rutkowski et al. |
| 2021/0346921 | A1* | 11/2021 | Banholzer ............ B65H 75/364 |
| 2022/0088649 | A1 | 3/2022 | Kehoe et al. |

* cited by examiner

CLOSET AUGER

CROSS REFERENCE TO RELATED APPLICATION

This application claims the benefit of U.S. Provisional Patent Application No. 63/350,143, filed on Jun. 8, 2022, the entire content of which is incorporated herein by reference.

BACKGROUND

The present invention relates to drain cleaning devices, such as closet augers.

Typically, drain cleaning devices are used to root out foreign material creating clogs and stoppages from plumbing pipelines and the like by the use of an elongated flexible coiled spring cable or cleaning "snake" rotatably drivable about its own axis. The drain cleaning apparatus may be a closet auger. During operation, a distal end of the cleaning snake is inserted into a pipeline and rotated to force the snake through the pipeline to workout clogs and stoppages within the pipeline. Accordingly, the closet auger may be used in cleaning out clogged toilets, sinks, bathtubs, and other plumbing circuits.

SUMMARY

In one embodiment, the invention provides a closet auger including a casing member extending along an axis and a drive member telescopically received in the casing member and moveable between an extended position and a retracted position relative to the casing member along the axis. The drive member includes a first end and a second end opposite the first end. The first end having an expanded portion that expands away from a remainder of the drive member. The expanded portion configured to contact the casing member and limit the axial movement of the drive member. The closet auger also includes a flexible cable removably connectable to the drive member.

In another embodiment, the invention provides a closet auger includes a casing member extending along an axis, a drive member telescopically received in the casing member and moveable between an extended position and a retracted position relative to the casing member along the axis, a flexible cable removably connectable to the drive member, a drive unit to rotationally drive the drive member, and a drive coupling mechanism to couple the drive member to the drive unit. The drive coupling mechanism includes a body defining a first end and a second end opposite the first end. The first end defines a bore configured to receive a shank of the drive unit. The body is made from a first material. The drive coupling mechanism also includes an adapter with an inner bore that receives the second end of the body. The adapter made from a second material that is different from the first material.

In another embodiment, the invention provides a closet auger including a casing member extending along an axis, a drive member telescopically received in the casing member and moveable between an extended position and a retracted position relative to the casing member along the axis, a flexible cable removably connectable to the drive member, a drive unit to rotationally drive the drive member, and a drive coupling mechanism to couple the drive member to the drive unit. The drive coupling mechanism includes a body defining a first end and a second end opposite the first end. The first end defines a bore configured to receive a shank of the drive unit. The drive coupling mechanism also includes a release mechanism to selectively secure the shank within the bore of the body. The release mechanism includes a shuttle. The shuttle is moveable between a first unlocked position, in which the shank can be selectively removed from the bore, and a second locked position, in which the shank is inhibited from being removed from the bore.

In another embodiment, the invention provides a closet auger including a casing member extending along an axis, a drive member telescopically received in the casing member and moveable between an extended position and a retracted position relative to the casing member along the axis, a flexible cable removably connectable to the drive member, and a crank handle coupled to the drive member to transfer torque to the drive member. The crank handle includes a crank arm with a first end and a second end opposite the first end. The first end includes a shank and the second end includes a swaged section. The crank handle also includes a handle coupled to the second end of the crank arm. The handle engaging the swaged section to inhibit axial movement of the handle.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figures 10, 11:
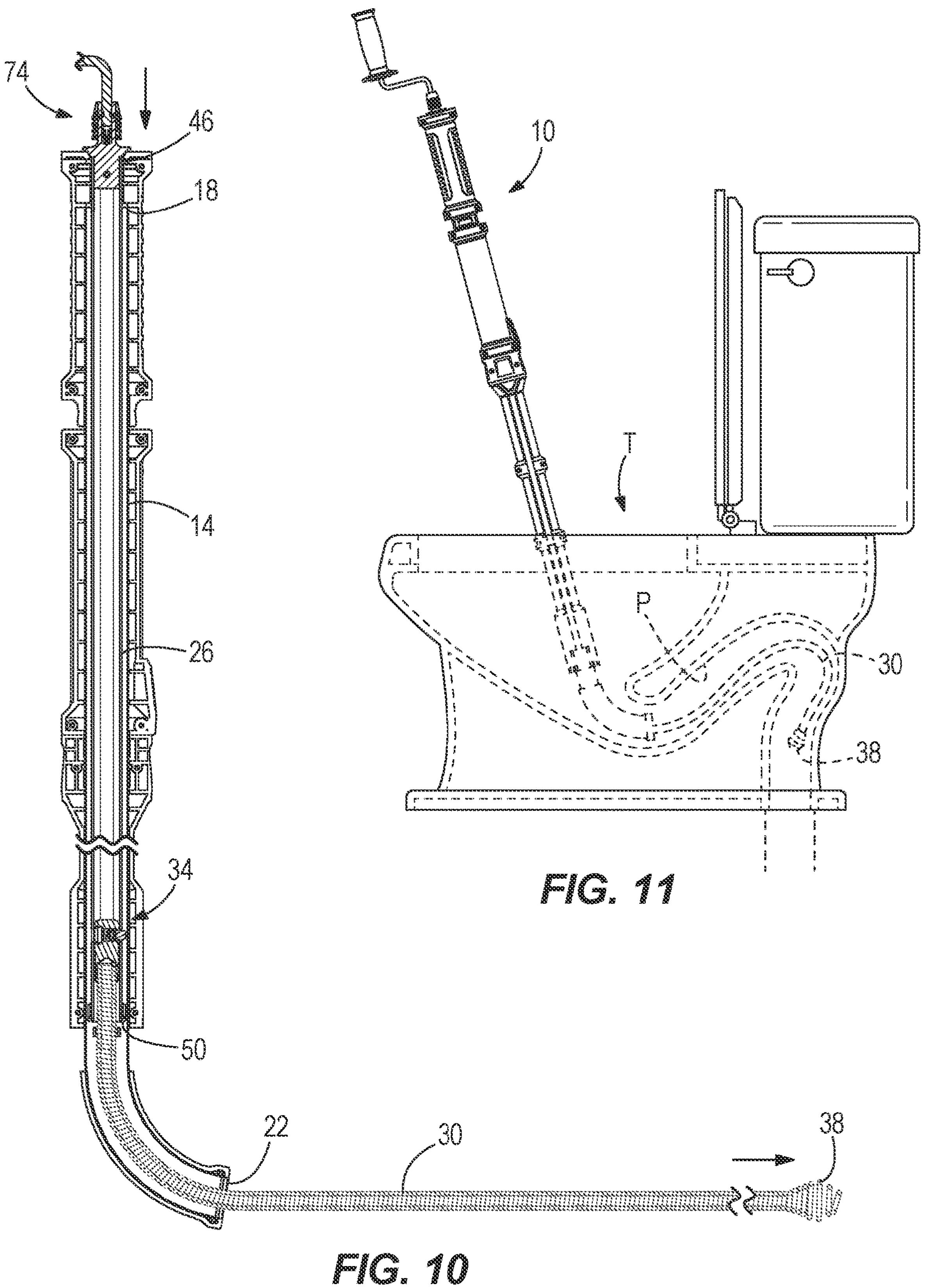
FIG. 10 is a cross-sectional view of the closet auger of FIG. 1, illustrating the drive member in the retracted position within the casing member, and the flexible cable in the second configuration.
FIG. 11 is a side view of the closet auger in operation with a toilet.

FIGS. 1-10 illustrate a closet auger 10 for clearing a drain pipeline P of a fixture, such as a toilet T, as shown in FIG. 11. The closet auger 10 may also be used to clear drain pipelines of other types of fixtures (e.g., urinals, drains, etc.).

Figure 1:
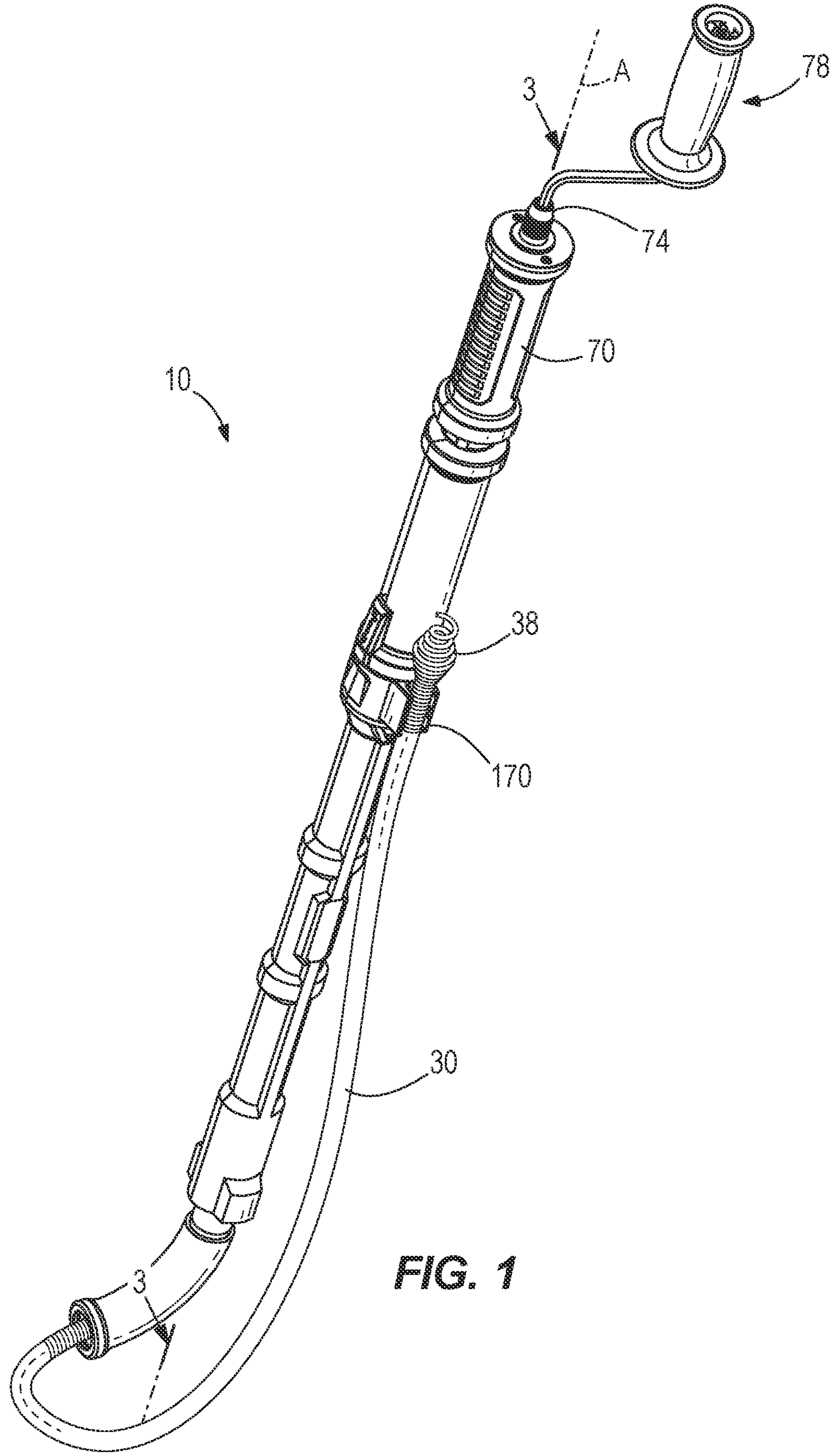
FIG. 1 is a perspective view of a closet auger in accordance with one embodiment of the invention.
Figure 2:
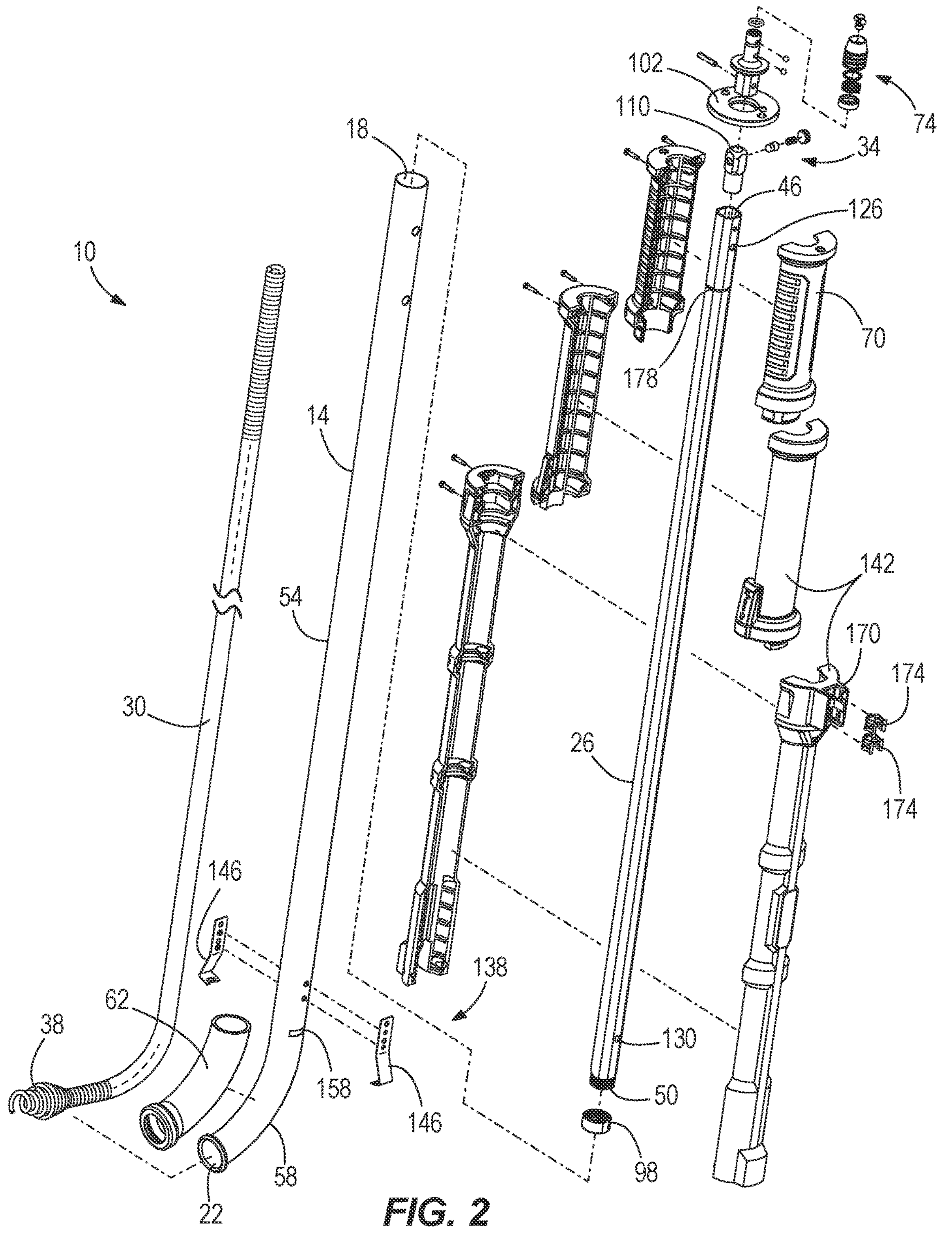
FIG. 2 is an exploded view of the closet auger of FIG. 1.

With reference to FIG. 2, the closet auger 10 includes an outer tube or elongated hollow casing member 14 generally extending along a longitudinal axis A (FIG. 1) from an upper end 18 toward a lower end 22, an inner tube or elongated hollow drive member 26 telescopically receivable within the casing member 14 via the upper end 18, and a flexible coiled spring cable or snake 30 also receivable within the casing member 14 and extending out of the lower end 22. The snake 30 includes an end with a connecting assembly 34 and an opposite end having a head 38 for breaking up clogs and objects within the drain pipeline. The connecting assembly 34 selectively connects the snake 30 to the drive member 26 adjacent either a first end 46 or a second end 50 of the drive member 26, as described in more detail below. The casing member 14 includes a straight portion 54 extending along the longitudinal axis A and a curved portion 58 extending from the straight portion 54 away from the axis A. The curved portion 58 is shaped to fit within an initial curved portion of the drain pipeline P within the toilet T so that the closet auger 10 can be oriented to extend generally upward, as shown in FIG. 11. A protective cover member or boot 62 fits over the curved portion 58. The protective cover member 62 may be made of rubber or a similar soft polymer to inhibit the lower end 22 of the casing member 14 from scratching or damaging the fixture during operation of the closet auger 10.

With continued reference to FIGS. 1-2, the closet auger 10 further includes a fixed handle 70 fixed to the casing member 14 adjacent the upper end 18 of the casing member 14 to allow a user to hold the closet auger 10 in place during operation. The fixed handle 70 may be fixed to the casing member 14 by fasteners or by another suitable method (e.g., adhesive, press fit, etc.). The closet auger 10 further includes a drive coupling mechanism 74 to connect a manual drive unit or crank handle 78 (see FIG. 1) to the first end 46 of the drive member 26 for manually rotationally driving the drive member 26 relative to the casing member 14 about the longitudinal axis A.

Figure 5:
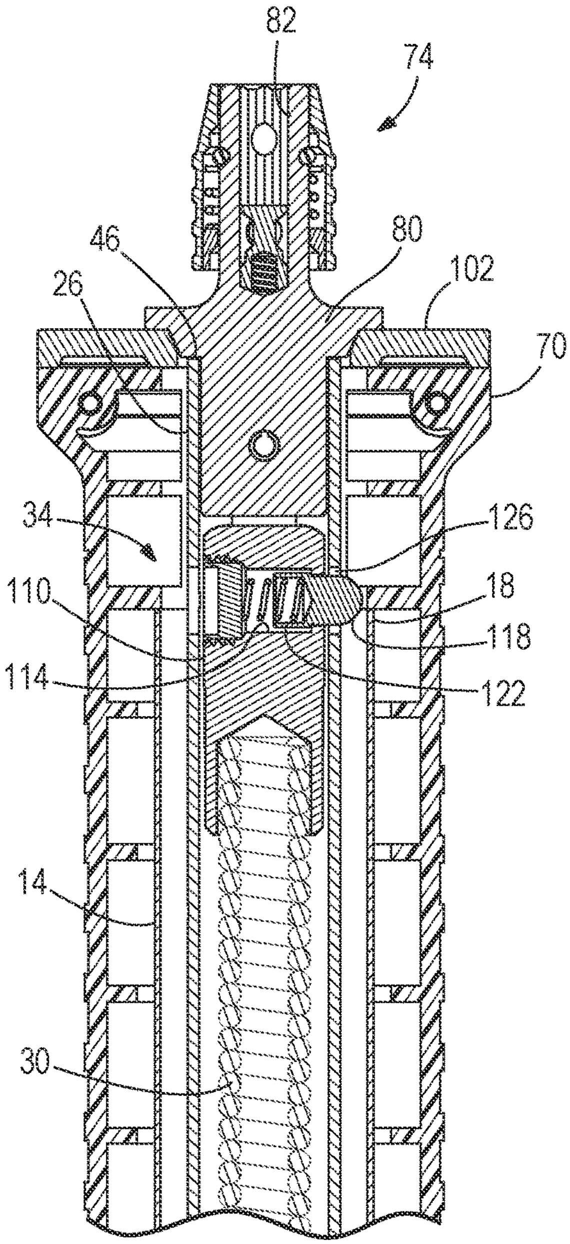
FIG. 5 is an enlarged cross-sectional view of a portion of the closet auger at section 55 in FIG. 3.

As shown in FIG. 5, the drive coupling mechanism 74 includes a body 80 that is a single monolithic piece made out of metal. The body 80 defines a bore 82 that is configured to receive a shank 84 (FIG. 3) of the crank handle 78. In the illustrated embodiment, the bore 82 and the shank 84 are both hexagonally-shaped. In further embodiments, the shank 84 may be an SDS or SDS plus shank. Alternatively, instead of the crank handle 78, a motorized drive unit may be coupled to the first end 46 of the drive member 26 via the drive coupling mechanism 74. The motorized drive unit may include a motor powered by a battery for selectively rotationally driving a drive mechanism couplable to the first end 46 of the drive member 26 by the drive coupling mechanism 74.

The drive member 26 may be telescopically moved along the axis A relative to the casing member 14 between a first, retracted position (see FIGS. 3, 5, and 10), in which the drive member 26 is telescopically received within the casing member 14, and a second, extended position (see FIGS. 4 and 9), in which the drive member 26 is telescopically extended from the casing member 14. When the drive member 26 is in the first position, the snake 30 is fully extended out of the lower end 22 of the casing member 14. When the drive member 26 is in the second position, a length of the snake 30 is drawn into the casing member 14. While a user grips the closet auger 10 at the fixed handle 70, the user may also grip the crank handle 78 (or the motorized drive unit) connected to the first end 46 of the drive member 26 to telescopically move the drive member 26 relative to the casing member 14 between the first and second positions to either extend the snake 30 from or draw the snake 30 into the casing member 14. An annular stop 98 (FIGS. 7-8) is threadingly coupled to the second end 50 of the drive member 26. The annular stop 98 contacts an end plate 102 (FIGS. 5-6) (through which the drive member 26 extends) coupled to the fixed handle 70 adjacent the upper end 18 of the casing member 14 to inhibit the drive member 26 from being completely removed from the casing member 14.

Figure 3:
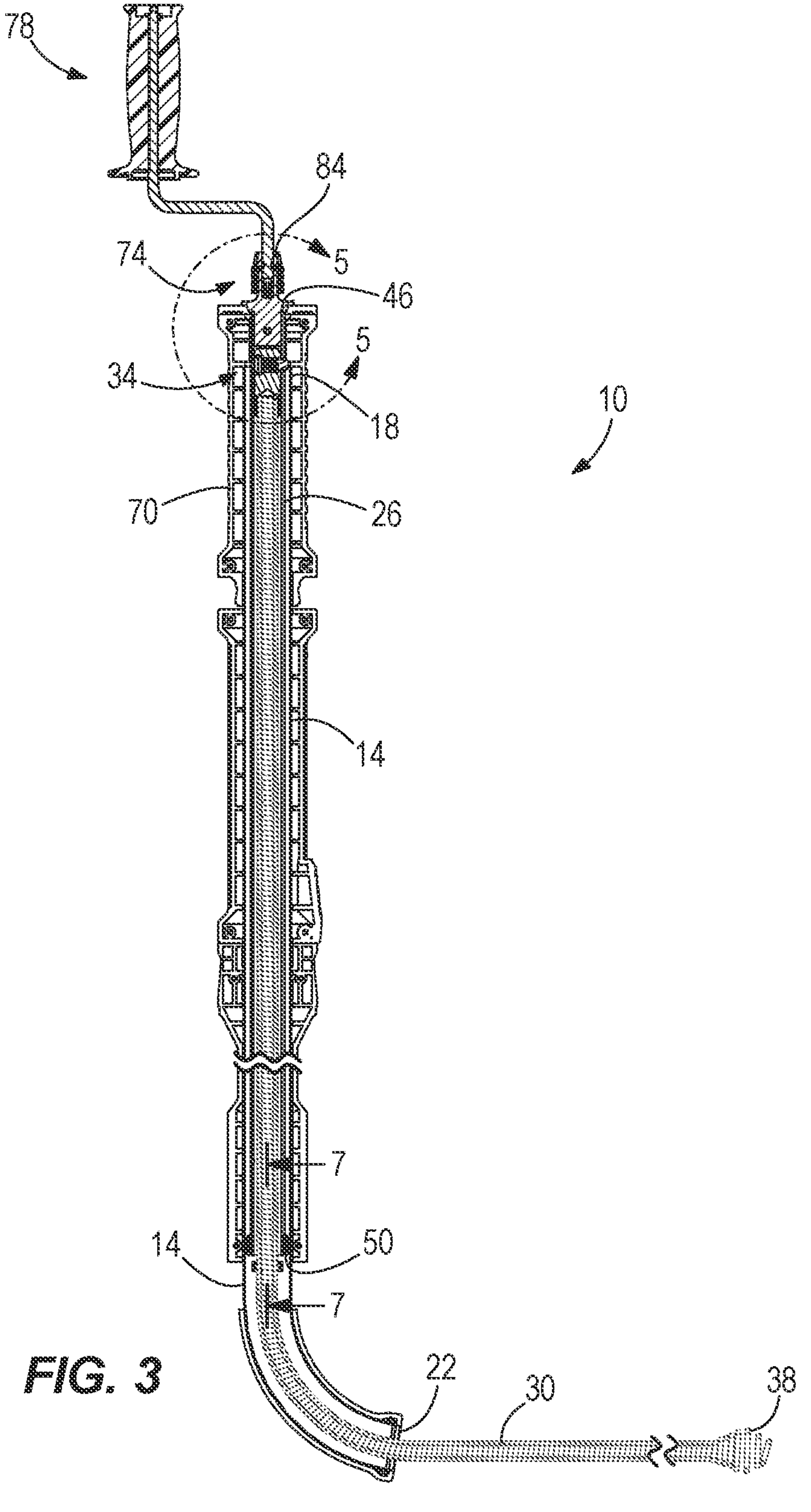
FIG. 3 is a cross-sectional view of the closet auger of FIG. 1 taken along line 3-3 in FIG. 1, illustrating a drive member of the closet auger in a retracted position within a casing member, and a flexible cable in a first configuration.
Figure 4:
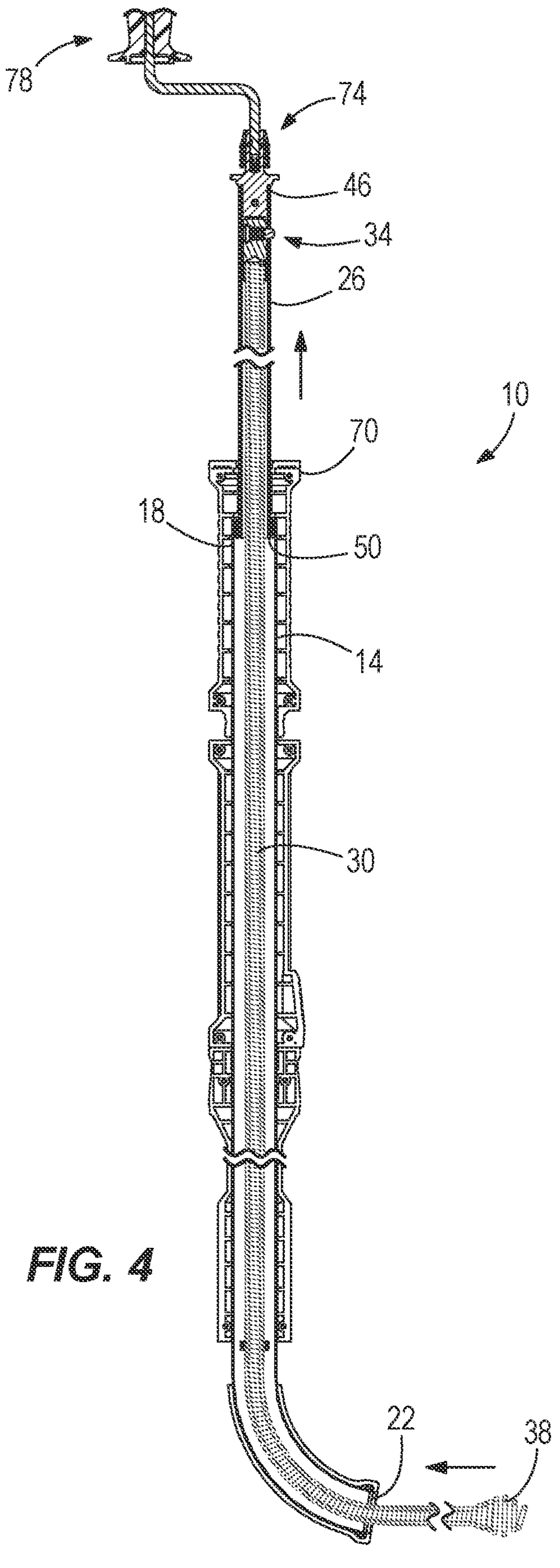
FIG. 4 is another cross-sectional view of the closet auger of FIG. 1, illustrating the drive member in an extended position from the casing member, and the flexible cable in the first configuration.
Figure 9:
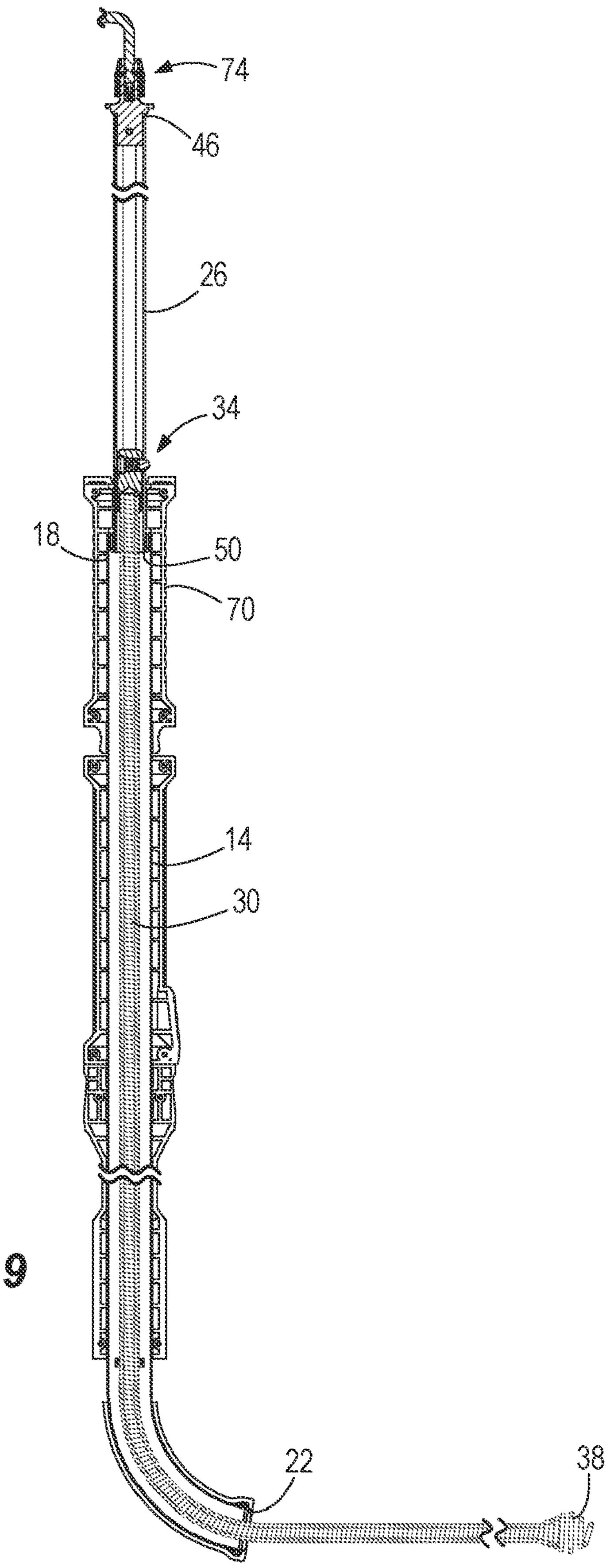
FIG. 9 is a cross-sectional view of the closet auger of FIG. 1, illustrating the drive member in the extended position from the casing member, and the flexible cable in a second configuration.

With reference to FIGS. 2 and 5, the connecting assembly 34 of the snake 30 includes a body 110 defining a bore 114 for receiving a detent 118 and a spring 122 arranged to bias the detent 118 radially outwardly. The body 110 is sized to be slidingly received within the drive member 26. The detent 118 is engageable with a first aperture 126 or a second aperture 130 defined in the drive member 26 adjacent the first and second ends 46, 50 of the drive member 26, respectively. When the detent 118 is engaged with the first aperture 126, a length of the snake 30 is retracted inside the drive member 26 in a sheathed configuration, as shown in FIGS. 3-4. When the detent 118 is engaged with the second aperture 130, the length of the snake 30 is extended from the drive member 26 in an unsheathed configuration, as shown in FIGS. 9-10. Accordingly, the maximum length that the snake 30 extends from the lower end 22 of the casing member 14 in the first position is increased when the snake 30 is in the unsheathed configuration (FIG. 10) as compared to the sheathed configuration (FIG. 3). The length of the snake 30 that is retracted and dispensed from inside the drive member 26 is equivalent to the distance between the first and second apertures 126, 130. In the illustrated embodiment, the length of the snake 30 that can be dispensed from or retracted into the drive member 26 is between approximately 2 feet and approximately 4 feet (e.g., approximately 3 feet). In some embodiments, the length may be less than 2 feet or greater than 4 feet.

While the connecting assembly 34 connects the snake 30 to the drive member 26 in either the sheathed or unsheathed configurations, the snake 30 is rotationally driven about its length by the drive member 26. As best shown in FIG. 2, the body 110 has a cross-section configured to drivingly engage with the cross-section of the drive member 26. Accordingly, the drive member 26 rotationally drives the snake 30 even when the detent 118 is not engaged with either of the first and second apertures 126, 130. In the illustrated embodiment, the cross-section of each of the body 110 and the drive member 26 is square. In other embodiments, the cross-sections may be another shape (e.g., triangular, rectangular, hexagonal, etc.). The cross-section of the casing member 14 is circular to allow the drive member 26 to freely rotate therein.

Figure 8:
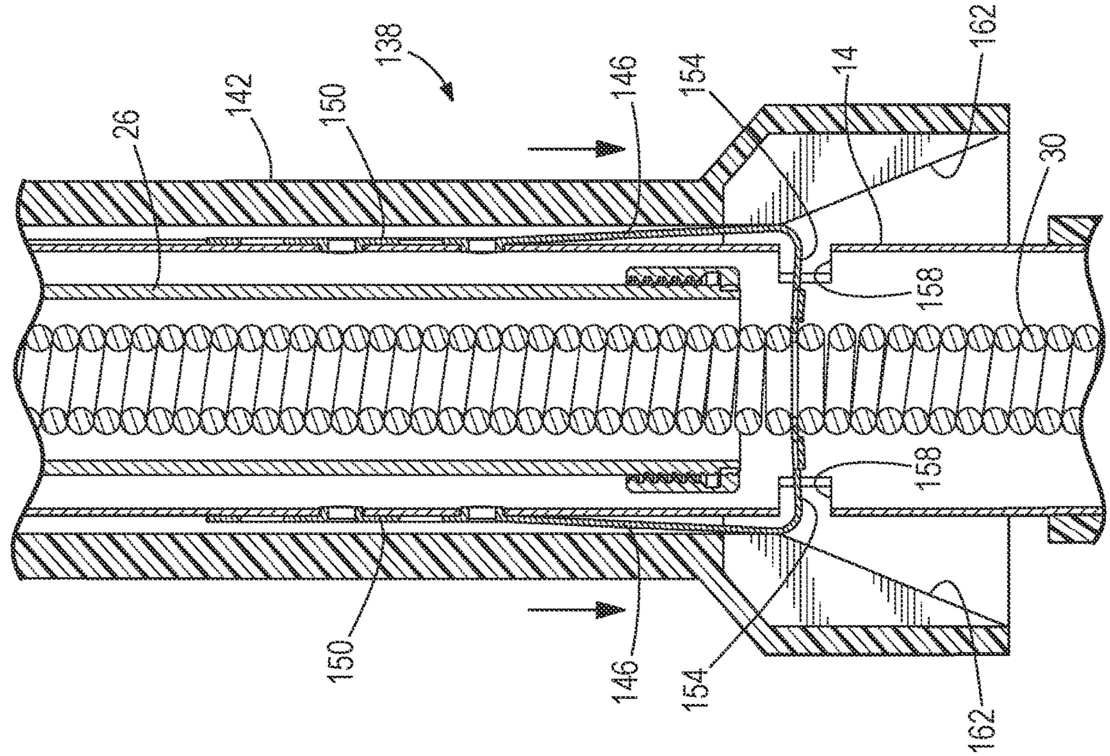
FIG. 8 is an enlarged cross-sectional view of the portion of the closet auger of FIG. 7, illustrating the gripping assembly in an engaged position.
Figure 7:
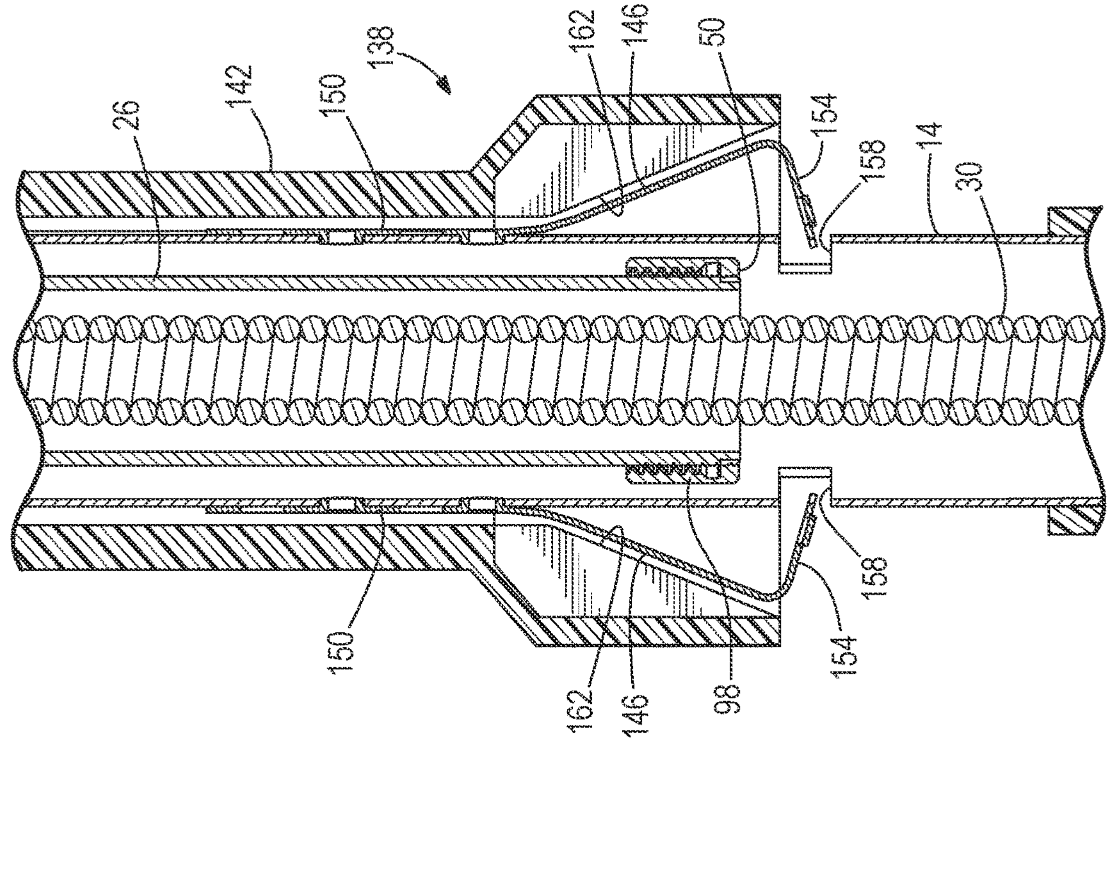
FIG. 7 is an enlarged cross-sectional view of a portion of the closet auger of FIG. 1 taken along line 7-7 in FIG. 3, illustrating a gripping assembly in a disengaged position.

With reference to FIGS. 2 and 7-8, the closet auger 10 further includes a cable retention assembly or gripping assembly 138. The gripping assembly 138 selectively grips the snake 30 to inhibit axial movement of the snake 30 relative to the casing member 14 without requiring a user to directly touch the snake 30. In the illustrated embodiment, the gripping assembly 138 includes a movable handle 142 and a pair of opposed cable retention members or gripping members 146. Each of the opposed gripping members 146 has a first end portion 150 fixedly coupled to the casing member 14 adjacent the lower end 22 of the casing member 14 and a second end portion 154 extending into the casing member 14 through corresponding slots 158 defined in the casing member 14 on opposite sides of the longitudinal axis A. Each of the gripping members 146 is a flexible spring member such that the second end portion 154 is biased radially outward from the longitudinal axis A, as shown in FIG. 7. The movable handle 142 includes a pair of cam members 162. The movable handle 142 may be manually slid between an upper position (FIG. 7) and a lower position (FIG. 8). When the movable handle 142 is in the upper position, the gripping members 146 are free to be biased outwardly. When the movable handle 142 is moved to the lower position, the second end portions 154 of the gripping members 146 are urged radially inward by the cam members 162 to engage the snake 30 from opposite sides to inhibit movement of the snake 30 relative to the casing member 14, as shown in FIG. 8. In some embodiments, the gripping assembly 138 may include more than two gripping members 146 circumferentially spaced about the axis A. In other embodiments, the gripping assembly 138 may include a single gripping member 146 configured to grip the snake 30 between the second end portion 154 of the gripping member 146 and an inner wall of the casing member 14 or a projection extending therefrom. In some embodiments, the cam members 162 may be replaced with a single cam surface arranged about the axis A to urge all of the gripping members 146 radially inward in the lower position.

With reference to FIGS. 1-2, a cable clip 170 is formed on an outer surface of the movable handle 142. The cable clip 170 secures and holds a portion of the snake 30 extending from the lower end 22 of the casing member 14 alongside the closet auger 10 for storage and travel. The cable clip 170 includes a plurality of spring clips 174 to securely grip the snake 30. In the illustrated embodiment, the spring clips 174 are separate components made of an elastic material such as metal. In some embodiments, the cable clip 170 may be integrally formed of an elastic material for holding the snake 30.

In operation, while the closet auger 10 is in a storage configuration (FIG. 1) in which the snake 30 is in the sheathed configuration within the drive member 26 and the drive member 26 is in the first position within the casing member 14, a user first disconnects the snake 30 from the cable clip 170 so that the snake 30 may extend freely out of the lower end 22 of the casing member 14, as shown in FIG. 3. While holding the fixed handle 70 with one hand, the user may grasp the crank handle 78 with the other hand and pull up on the drive member 26 causing the drive member 26 to telescopically slide from the first position (FIG. 3) to the second position (FIG. 4), thus drawing the snake 30 into the casing member 14 such that the head 38 is adjacent the lower end 22 of the casing member 14. The head 38 of the snake 30 and the lower end 22 of the casing member 14 are then inserted into the drain pipeline P of the toilet T (FIG. 11). Once inserted, the user may push down on the drive member 26 via the crank handle 78 to move the drive member 26 from the second position back to the first position (FIG. 3) causing the head 38 of the snake 30 to be forced down the drain pipeline P to break up or remove any stoppage therein. The user may also simultaneously rotationally drive the drive member 26 via the crank handle 78 to rotate the head 38 of the snake 30 to assist in breaking up or removing the stoppage. The user may extend and retract the snake 30 from the casing member 14 as necessary until the stoppage is fully broken up or removed.

Figure 6:
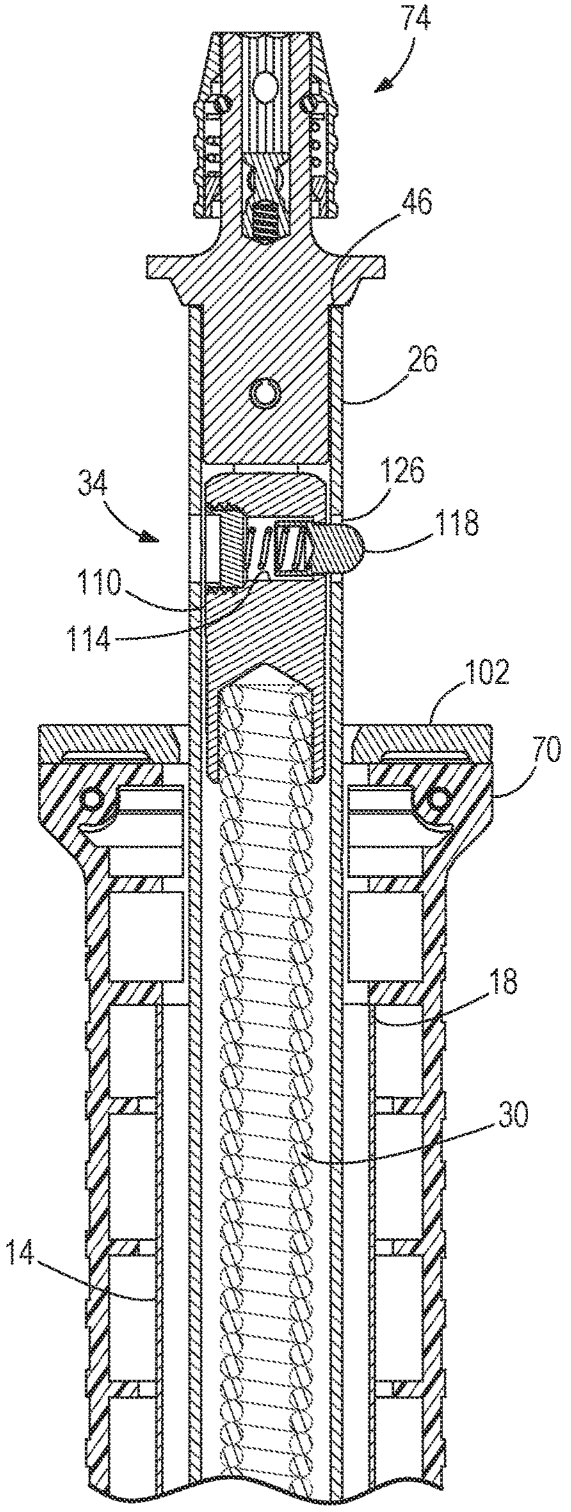
FIG. 6 is an enlarged cross-sectional view of the portion of the closet auger of FIG. 5, illustrating the drive member partially extended from the casing member.

In some cases, the stoppage may be located further down the drain pipeline P than the snake 30 is capable of reaching while the drive member 26 is in the first position and the snake 30 is in the sheathed configuration within the drive member 26. As such, it may be necessary to unsheathe the length of the snake 30 retracted into the drive member 26 to increase the length of the snake 30 that may extend from the lower end 22 of the casing member 14. To do this while the drive member 26 is in the first position (FIG. 3), the user first pulls up on the crank handle 78 to partially extend the drive member 26 out of the casing member 14 such that the detent 118 extending from the first aperture 126 is exposed from the upper end 18 of the casing member 14, as shown in FIG. 6. The user then slides the movable handle 142 relative to the casing member 14 from the upper position (FIG. 7) to the lower position (FIG. 8), causing the cam members 162 to urge the first ends 46 of the gripping members 146 radially inward to engage the snake 30 and inhibit axial movement of the snake 30 relative to the casing member 14. The user may then manually depress the detent 118 against the bias of the spring 122 to unlock the detent 118 from the first aperture 126. The user then pulls up on the crank handle 78 to extend the drive member 26 toward the second position. Due to the snake 30 being retained relative to the casing member 14, the length of the snake 30 within the drive member 26 is unsheathed, until the detent 118 reaches the second aperture 130 in the drive member 26. The detent 118 is then biased outwardly to engage the second aperture 130 and lock the snake 30 in the unsheathed configuration with the drive member 26, as shown in FIG. 9.

The drive member 26 includes an indicator mark 178 (see FIG. 2) adjacent the first end 46 of the drive member 26 to visually indicate to the user the maximum extent that the drive member 26 can be partially extended from the upper end 18 of the casing member 14 (see FIG. 6) before gripping the snake 30 with the griping members 146 and unsheathing the snake 30 from the drive member 26 in the unsheathed configuration. Accordingly, the indicator mark 178 helps inhibit the user from over extending the drive member 26 from the upper end 18 of the casing member 14 and creating a situation where after gripping the snake 30 with the gripping assembly 138 and pulling the drive member 26 to the second position, the second aperture 130 does not reach the detent 118 to interface with and lock the connecting assembly 34 adjacent the second end 50 of the drive member 26. In the illustrated embodiment, the indicator mark 178 is a groove defined about the drive member 26. In other embodiments, the indicator mark 178 may include paint within the groove. The paint may be a color that contrasts with the color of the drive member 26 to provide improved visual indication. In some embodiments, the indicator mark 178 may be painted on the surface of the drive member 26 without a groove defined in the drive member 26.

Once the snake 30 is in the unsheathed configuration, the user may move the movable handle 142 relative to the casing member 14 from the lower position (FIG. 8) back to the upper position (FIG. 7) allowing the first end 46 of the gripping members 146 to be biased radially outward, thus disengaging the second end portions 154 of the gripping members 146 from the snake 30. Similarly as described above, the user may then push down on the drive member 26 via the crank handle 78 to move the drive member 26 into the casing member 14 from the second position back toward the first position (FIG. 10), causing the head 38 of the snake 30 to be moved further down the drain pipeline P by the increased length of the snake 30 unsheathed from the drive member 26 or until the head 38 reaches the stoppage. The user may then extend and retract the snake 30 from the casing member 14 while rotationally driving the drive member 26 to rotate the head 38 of the snake 30 to assist in breaking up or dislodging the stoppage.

To retract the snake 30 back within the drive member 26 in the sheathed configuration, the opposite sequence of events is performed. More specifically, the drive member 26 is extended out of the casing member 14 to the first position such that the detent 118 extending from the second aperture 130 is exposed from the upper end 18 of the casing member 14, as shown in FIG. 9. The user then slides the movable handle 142 relative to the casing member 14 from the upper position (FIG. 7) to the lower position (FIG. 8) to grip the snake 30 with the gripping members 146 to inhibit axial movement of the snake 30 relative to the casing member 14, as described above. The user may then manually depress the detent 118 against the bias of the spring 122 to unlock the detent 118 from the second aperture 130. The user then pushes down on the crank handle 78 to retract the drive member 26 toward the first position. Due to the snake 30 being retained relative to the casing member 14, the length of the snake 30 is again sheathed within the drive member 26, until the detent 118 reaches the first aperture 126 in the drive member 26. The detent 118 is then biased outwardly to engage the second aperture 130 and lock the snake 30 back in the sheathed configuration, as shown in FIG. 3. The lower end 22 of the casing member 14 and the snake 30 is then pulled out of the drain pipeline P. The snake 30 may then be clipped to the side of the closet auger 10 by the cable clip 170 to secure the snake 30 back in the storage configuration.

Figure 12:
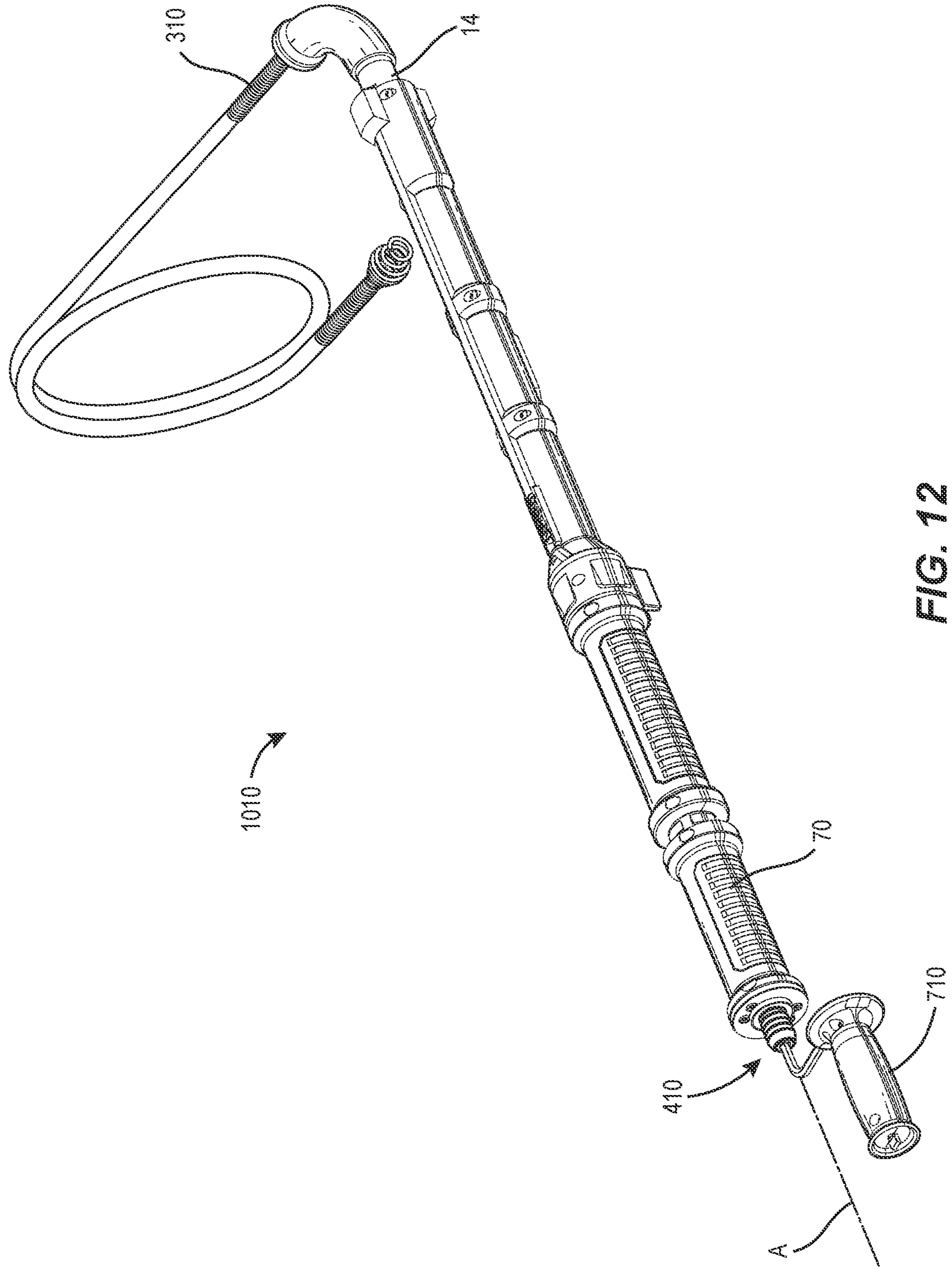
FIG. 12 is a perspective view of a closet auger in accordance with another embodiment of the invention.
Figure 13:
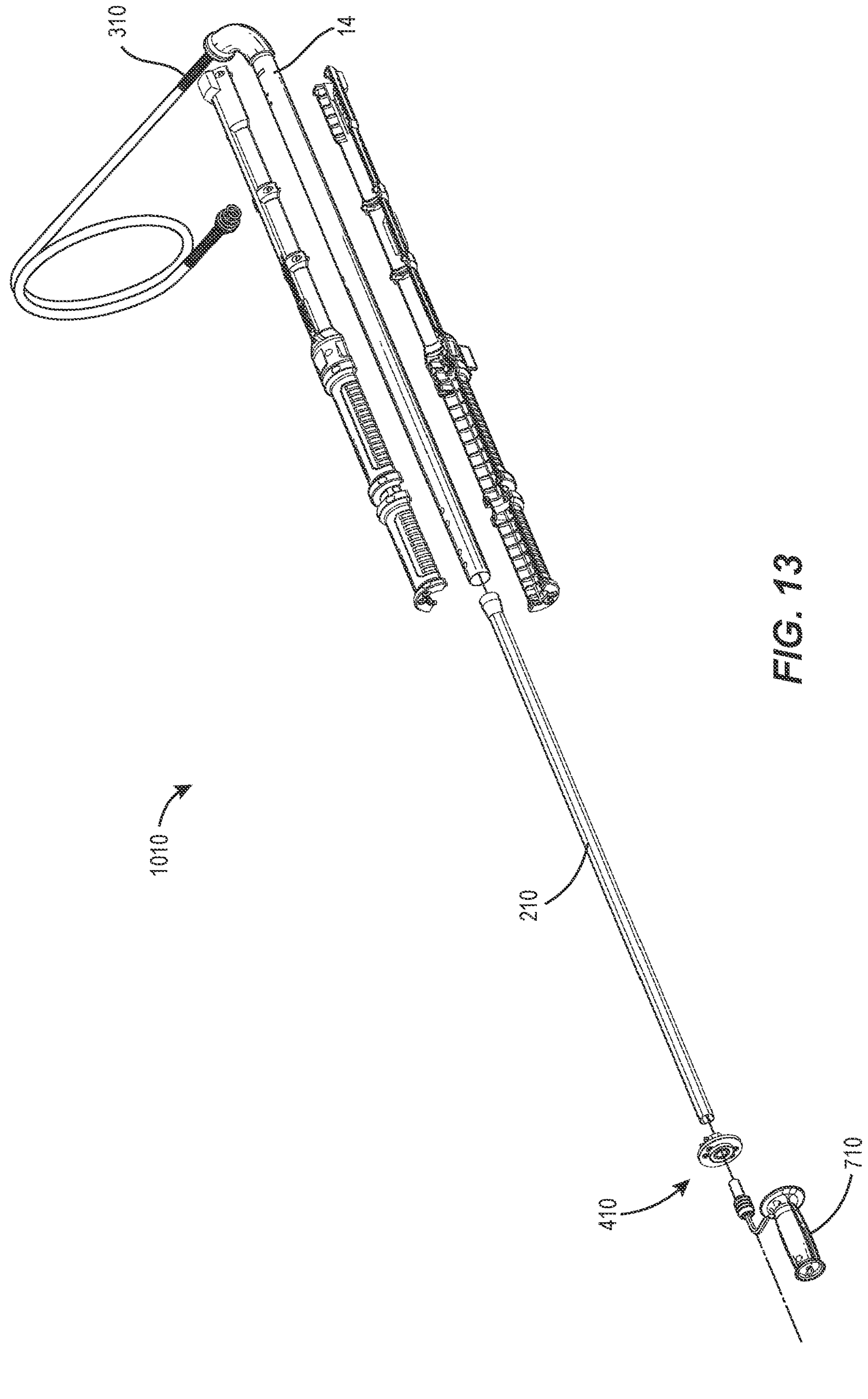
FIG. 13 is an exploded view of the closet auger of FIG. 12.

FIGS. 12 and 13 illustrate a closet auger 1010 according to another embodiment of the invention. The closet auger 1010 is similar to the closet auger 10 discussed above with like features being represented with like reference numbers. The closet auger 1010 functions in a similar way as the closet auger 10 described above. Features of the closet auger 1010 that differ from the closet auger 10 will be discussed in more detail below. For example, the closet auger 1010 includes a drive member 210, a snake 310, a drive coupling mechanism 410, and a crank handle 710. The other features of the closet auger 1010 should be understood to be the same or similar as those described above and are not repeated below.

Figure 14:
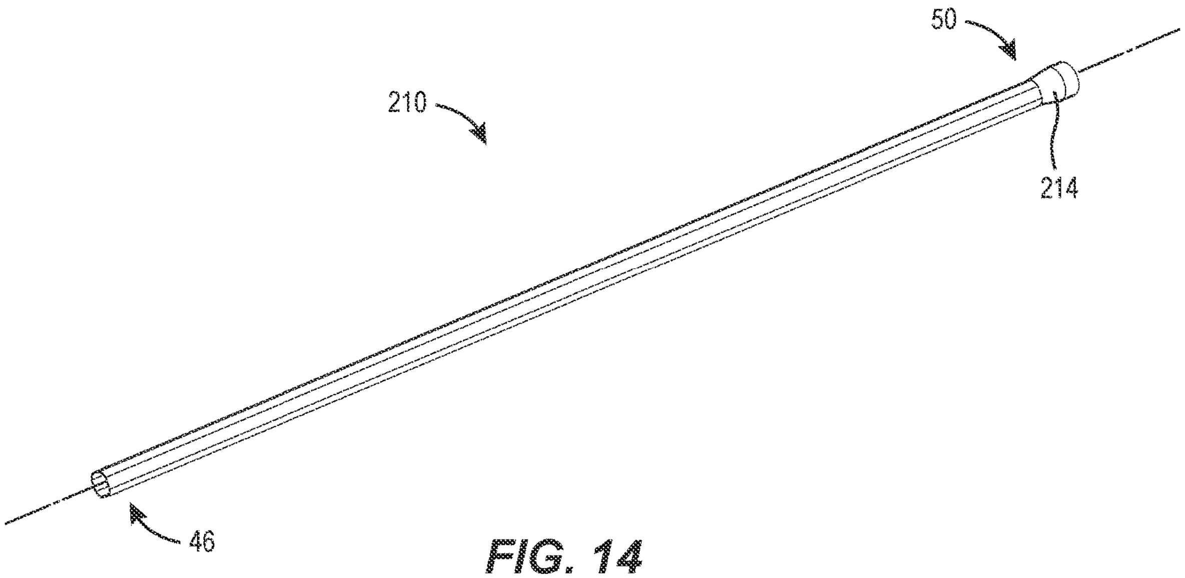
FIG. 14 is a perspective view of a drive member of the closet auger of FIG. 12.
Figure 15:
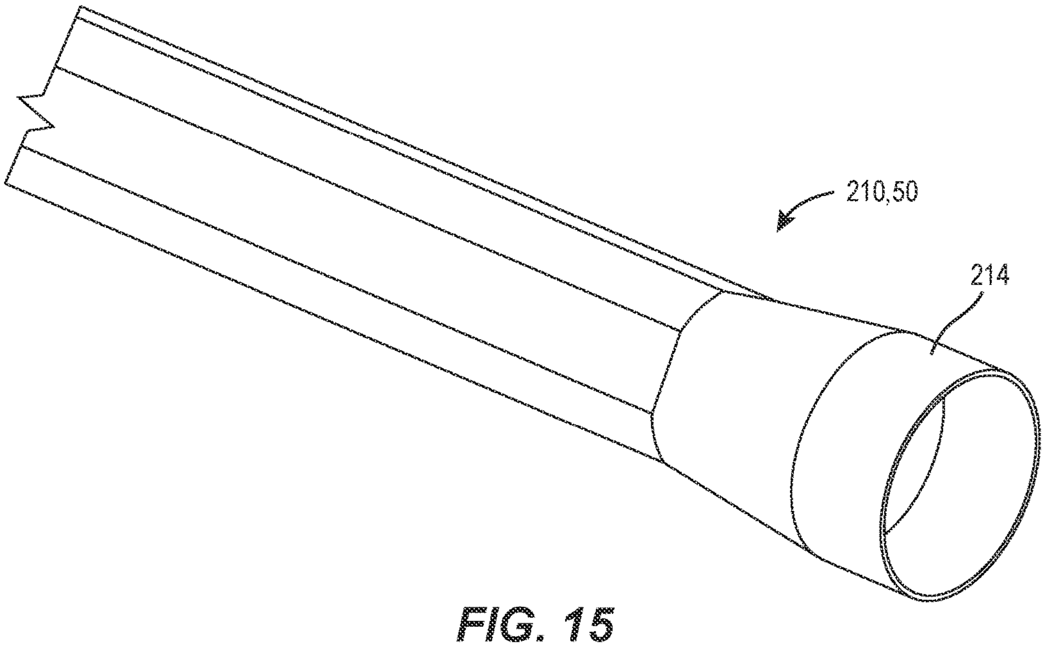
FIG. 15 is a perspective view of a portion of the drive member of FIG. 14.

With reference to FIGS. 14 and 15, the drive member 210 is similar to the drive member 26 discussed above with like features being represented with like reference numbers. The drive member 210 includes the first and second ends 46, 50. Instead of the annular stop 98 being threadably connected to the second end 50, however, the second end 50 includes an expanded portion 214. The expanded portion 214 is enlarged relative the remainder of the drive member 210. For example, the illustrated expanded portion 214 generally has a frustoconical shape that expands away from the remainder of the drive member 210. The expanded portion 214 is formed using a metal forming operation that forms the expanded portion 214 into a similar shape as the annular stop 98. As such, the expanded portion 214 is integral with the drive member 210. While telescopically moving the drive member 210 relative to the casing member 14 between the first and second positions discussed above, the expanded portion 214 contacts the end plate 102 to inhibit the drive member 210 from being completely removed from the casing member 14. In the illustrated embodiment, the drive member 210 includes a wall thickness between 0.7 millimeters and 1 millimeters. In other embodiments, the wall thickness may be less than 0.7 millimeters or more than 1 millimeters. In some embodiments, the drive member 210 may be made out of a metal material such as aluminum or steel.

Figure 16:
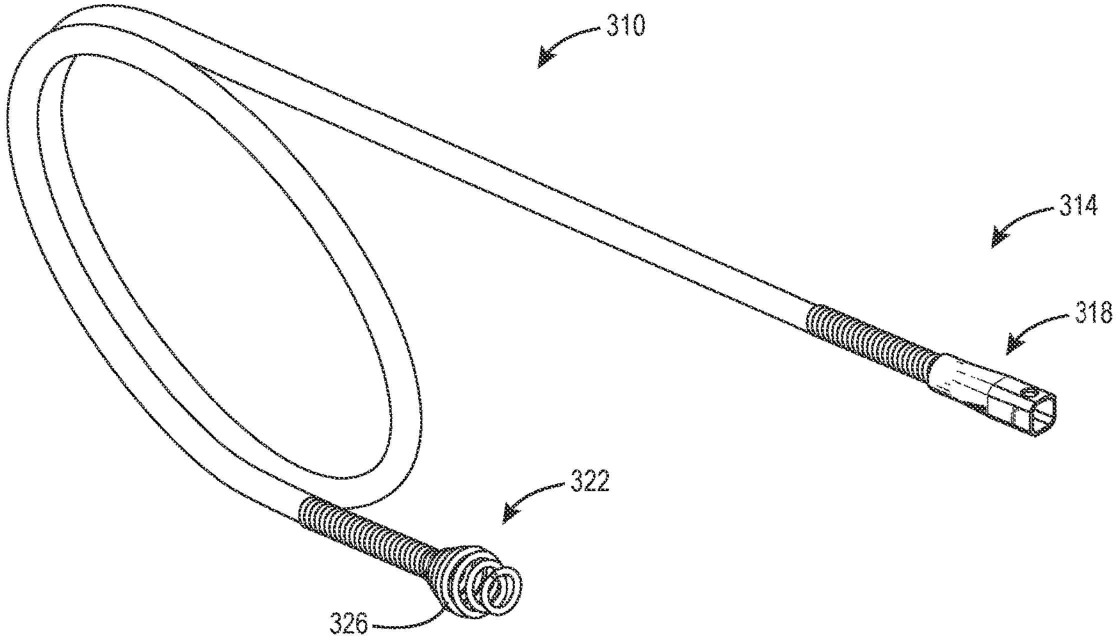
FIG. 16 is a perspective view of a flexible cable including a connecting assembly of the closet auger of FIG. 12.
Figure 17:
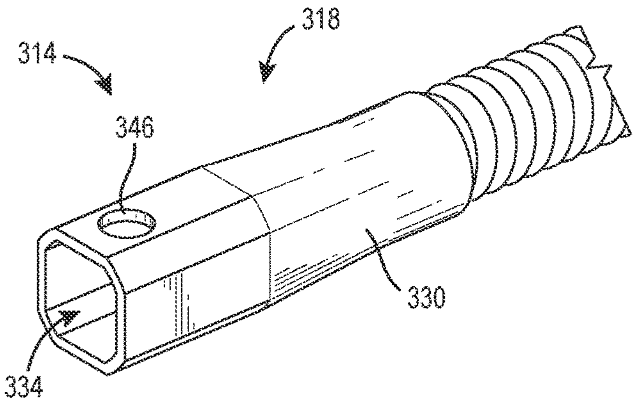
FIG. 17 is a perspective view of the connecting assembly of FIG. 16.
Figure 18:
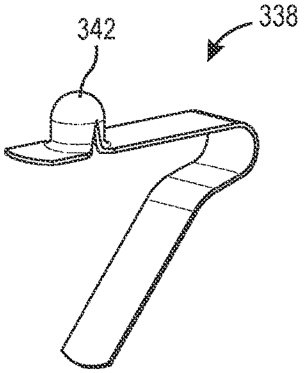
FIG. 18 is a perspective view of a resilient member of the connecting assembly of FIG. 17.
Figure 19:
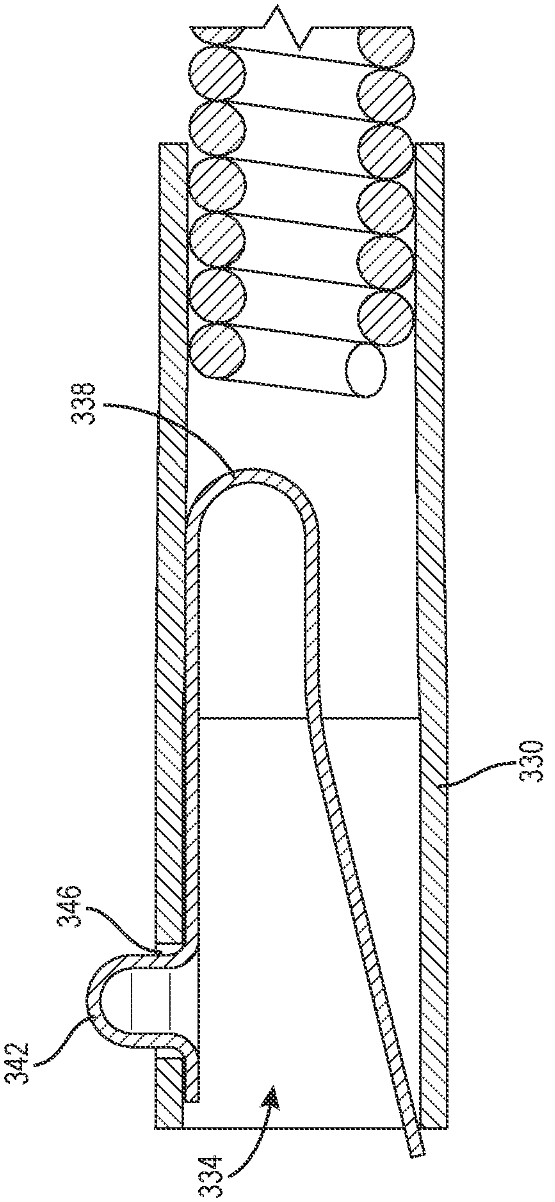
FIG. 19 is a cross-sectional view of the connecting assembly of FIG. 17.

Moving to FIG. 16, the snake 310 is similar to the snake 30 discussed above with like features being represented with like reference numbers. The snake 310 includes a first end 314 with a connecting assembly 318 and an opposite second end 322 having a head 326 for breaking up clogs and objects within the drain pipelines. The connecting assembly 318 selectively connects the snake 310 to the drive member 210 adjacent either the first end 46 or the second end 50 of the drive member 210. Moving to FIGS. 17-19, the connecting assembly 318 includes a sleeve 330. In the illustrated embodiment, a metal forming process is used to form an extruded tube (i.e., the sleeve 330) into a polygonal or non-circular geometry at the first end 314 of the connecting assembly 318. In the illustrated embodiment, the sleeve 330 has a square geometry. In other embodiments, the sleeve 330 may have other geometries. The sleeve 330 is then secured to the snake 310 by, for example, crimping, welding and/or press-fitting. The sleeve 330 defines a cavity 334 for receiving a resilient member 338 having a detent 342 (FIG. 18) arranged inside the cavity 334 to bias the detent 342 radially outwardly through an opening 346. In the illustrated embodiment, the resilient member 338 is a spring steel push button detent. In other embodiments, other suitable resilient members may be used. The resilient member 338 may be secured within the cavity 334 with a fastener, by welding, or other means known in the art. Alternatively, the resilient member 338 may be secured within the cavity 334 by its own bias and not need anything additional to secure it.

The sleeve 330 is shaped and sized to be slidingly received within an interior of the drive member 210. The detent 342 is engageable with the first aperture 126 or the second aperture 130 defined in the drive member 210 adjacent the first and second ends 46, 50 of the drive member 210, respectively. When the detent 342 is engaged with the first aperture 126, a length of the snake 310 is retracted inside the drive member 210 in a sheathed configuration. When the detent 342 is engaged with the second aperture 130, the length of the snake 310 is extended from the drive member 210 in an unsheathed configuration.

While the connecting assembly 318 connects the snake 310 to the drive member 210 in either the sheathed or unsheathed configurations, the snake 310 is rotationally driven about its length by the drive member 210. The sleeve 330 has a cross-section configured to drivingly engage with the cross-section of the drive member 210. Accordingly, the drive member 210 rotationally drives the snake 310 even when the detent 342 is not engaged with either of the first and second apertures 126, 130. In the illustrated embodiment, the cross-section of each of the sleeve 330 and the drive member 210 is square. In other embodiments, the cross-sections may be another shape (e.g., D-shaped, triangular, rectangular, hexagonal, etc.). The cross-section of the casing member 14 is circular to allow the drive member 210 to freely rotate therein.

Figure 20:
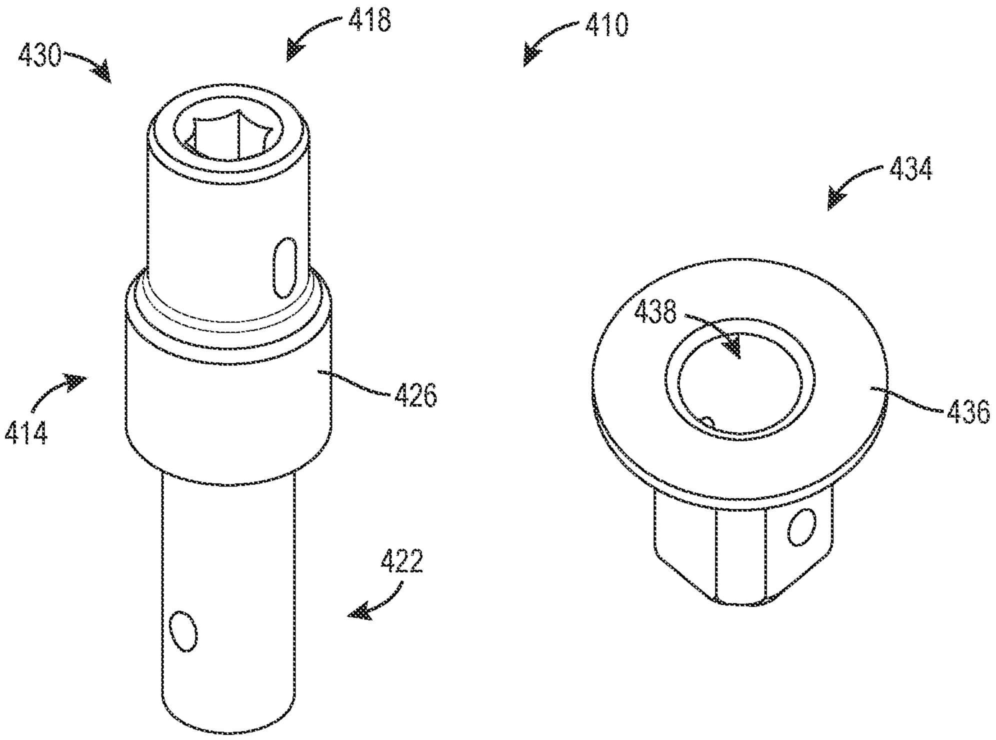
FIG. 20 is an exploded view of a drive coupling mechanism of the closet auger of FIG. 12.
Figure 21:
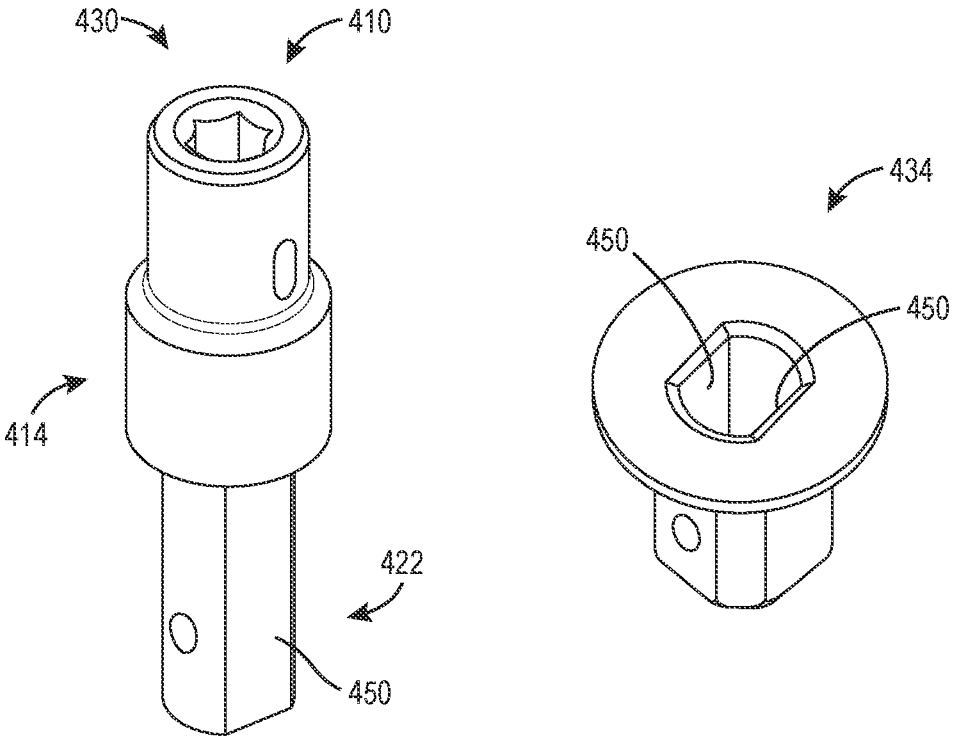
FIG. 21 is an exploded view of a drive coupling mechanism according to another embodiment of the invention.

With reference to FIG. 20, the drive coupling mechanism 410 is similar to the drive coupling mechanism 74 discussed above with like features being represented with like reference numerals. The drive coupling mechanism 410 connects the crank handle 710 or a motorized drive unit to the first end 46 of the drive member 210 for rotationally driving the drive member 210 relative to the casing member 14 about the longitudinal axis A. The drive coupling mechanism 410 includes a body 414 defining a first end 418, a circular second end 422 opposite the first end 418, and a flange 426 positioned between the first and second ends 418, 422. The first end 418 of the body 414 defines a bore 430 that is operable to receive a shank 734 (FIG. 27) of the crank handle 710 or the shank of a motorized drive unit. The drive coupling mechanism 410 also includes an adapter 434 coupled to the second end 422 of the body 414. The adapter 434 engages the end plate 102 to inhibit the body 414 and the drive member 210 from entering the interior of the casing member 14. The adapter 434 may be coupled to the body 414 using a spring pin or other fastener. The adapter 434 includes a flange 436 at a first end and a bore 438 extending centrally through the adapter 434. The adapter 434 includes an outer cross-section that is square-shaped and an inner cross-section of the bore 438 that is circular. The outer cross-section is similar to the cross-section of the drive member 210 so that torque is transferred from the crank handle 710 or a shank of a motorized drive unit (e.g., drill or other device) to the drive member 210 through the drive coupling mechanism 410. In the illustrated embodiment, the inner cross-section is round to receive the circular second end 422 of the body 414. In other embodiments, the inner cross section may include flat surfaces 450 that correspond to flat surfaces 450 on the second end 422 of the body 414 (FIG. 21). The flat surfaces 450 are able to transfer more torque to the drive member 210 from the crank handle 710 or other drive unit. Although not shown, the body 414 includes a locking sphere (i.e., ball detent) positioned within the bore 430 that engages a groove 738 (FIG. 27) on the shank 734 of the crank handle 710 (or the motorized drive unit/drill bit) to secure the crank handle 710 to the drive coupling mechanism 410. In other embodiments, the body may include two or more locking spheres that engage the groove 738.

In the illustrated embodiment, the drive coupling mechanism 410 is a bi-material design. In other words, the body 414 is made from a first material and the adapter 434 is made from a second material that is different from the first material. The first material may be a metal such as steel or aluminum, and the second material may be a plastic. Providing an adapter 434 with a bi-material design lowers the cost to manufacture the drive coupling mechanism 410. For instance, having the body 414 formed from a harder material such as metal does not fatigue or damage the drive coupling mechanism 410 through over torquing when torque is transferred from the crank handle 710 while allowing a plastic adapter 434 to connect the drive coupling mechanism 410 to the drive member 210.

Figure 23:
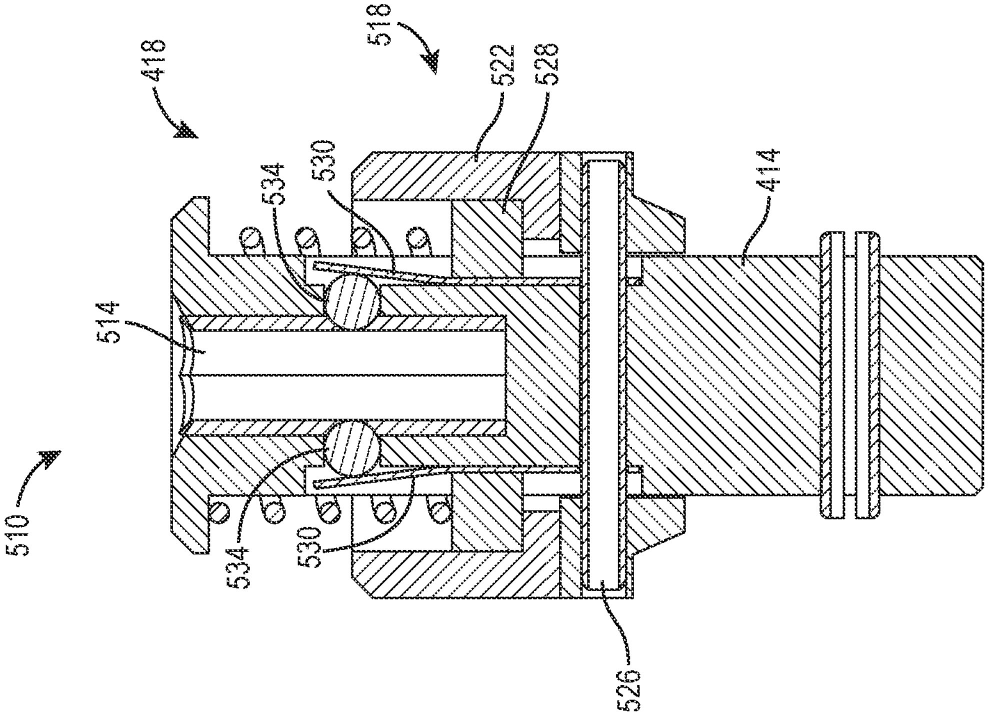
FIG. 23 is a cross-sectional view of the drive coupling assembly of FIG. 22 in an unlocked position.
Figure 22:
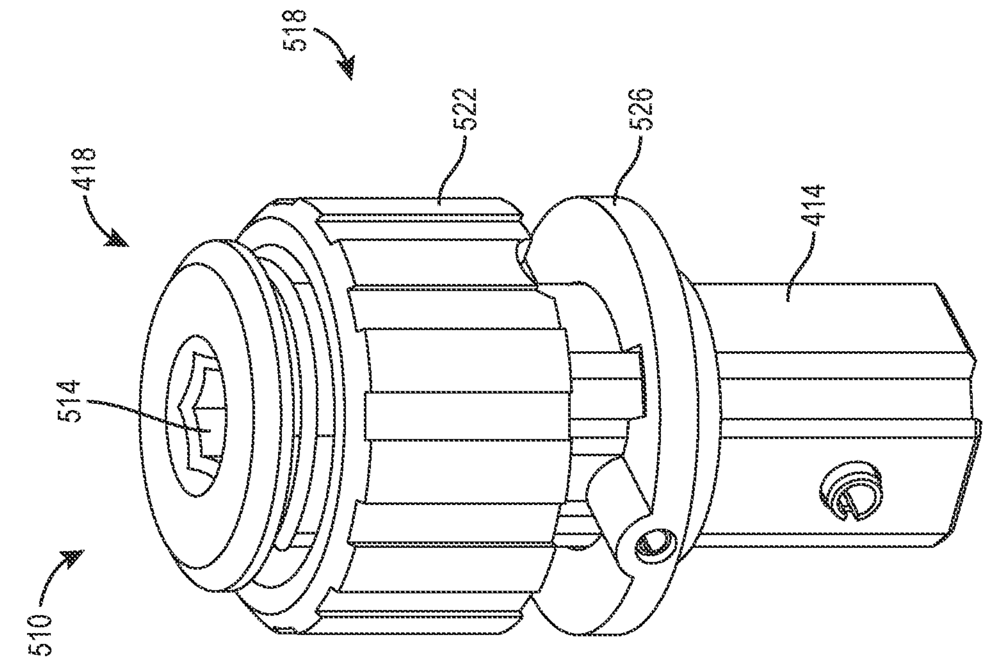
FIG. 22 is a perspective view of a drive coupling mechanism according to another embodiment of the invention in a locked position.

FIGS. 22 and 23 illustrate a drive coupling mechanism 510 according to another embodiment of the invention. The drive coupling mechanism 510 is similar to the drive coupling mechanism 410 with like features being represented with like reference numbers. The drive coupling mechanism 510 includes a metal hex insert 514 adjacent the first end 418 of the body 414 and a release mechanism 518 to selectively secure a shank of either the crank handle 710 or a motorized drive unit within the hex insert 514. The release mechanism 518 includes a shuttle 522 that is rotatably supported on the first end 418 of the body 414 and a stop ring 526 that limits the axial movement of the shuttle 522. The shuttle 522 includes internal threads (not shown) that engage external threads (not shown) on the first end 418 of the body 414. Accordingly, rotation of the shuttle 522 axially moves the shuttle 522 between a first unlocked position (FIG. 23) and a second locked position (FIG. 22). A resilient member (e.g., a torsional spring (not shown)) biases the shuttle 522 to the locked position. However, the shuttle 522 may be secured in the locked position with a locking mechanism (not shown).

With reference to FIG. 23, as the shuttle 522 is moved from the first position to the second position, a protrusion ring 528 positioned within the shuttle 522 engages flat resilient members 530 (e.g., steel flat springs) to inhibit the resilient members 530 from moving radially outwards. Inhibiting the resilient members 530 from moving radially outwards inhibits locking spheres 534 from being able to move radially outwards allowing the locking spheres 534 to engage the groove 738 on the shank 734 of the crank handle 710 (or the motorized drive unit) to secure the crank handle 710 to the drive coupling mechanism 510. Conversely, moving the shuttle 522 from the second position to the first position allows the locking spheres 534 to move radially outwards and deform the resilient members 530, allowing the locking spheres 534 to disengage the groove 738 so the shank 734 can be removed or inserted from the insert 514. In some embodiments, the body 414, the shuttle 522, and the stop ring 526 may be made from a plastic material to lower manufacturing costs, while the hex insert 514 is made from a hard metal to receive the torque from the crank handle 78.

Figure 24:
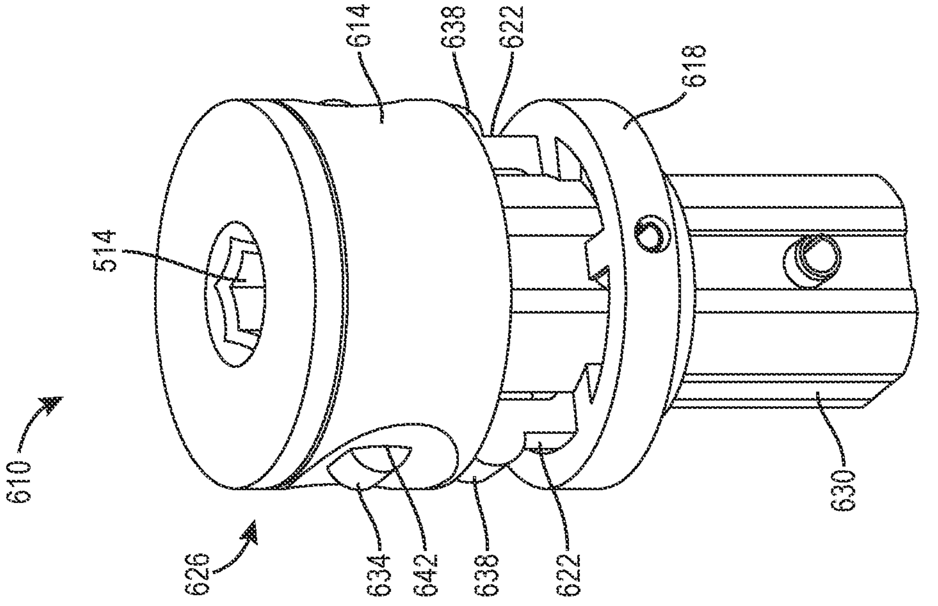
FIG. 24 is a perspective view of a release mechanism according to another embodiment of the invention.
Figure 25:
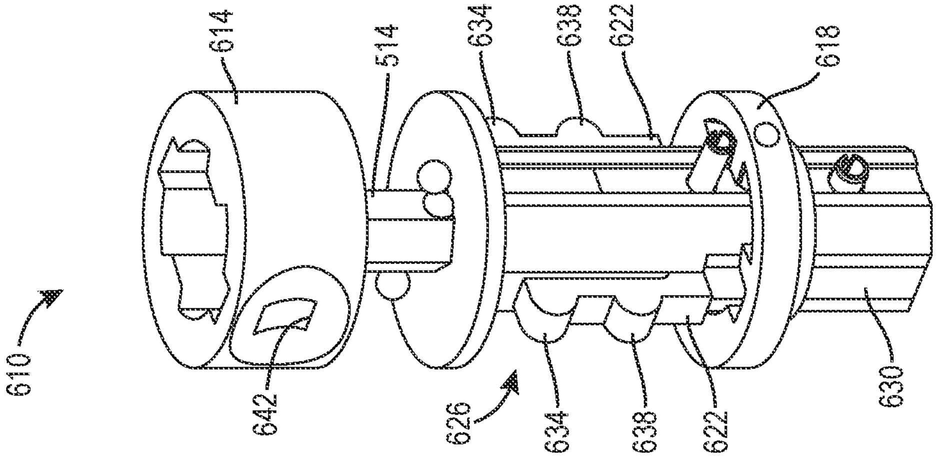
FIG. 25 is an exploded view of the release mechanism of FIG. 23.
Figure 26:
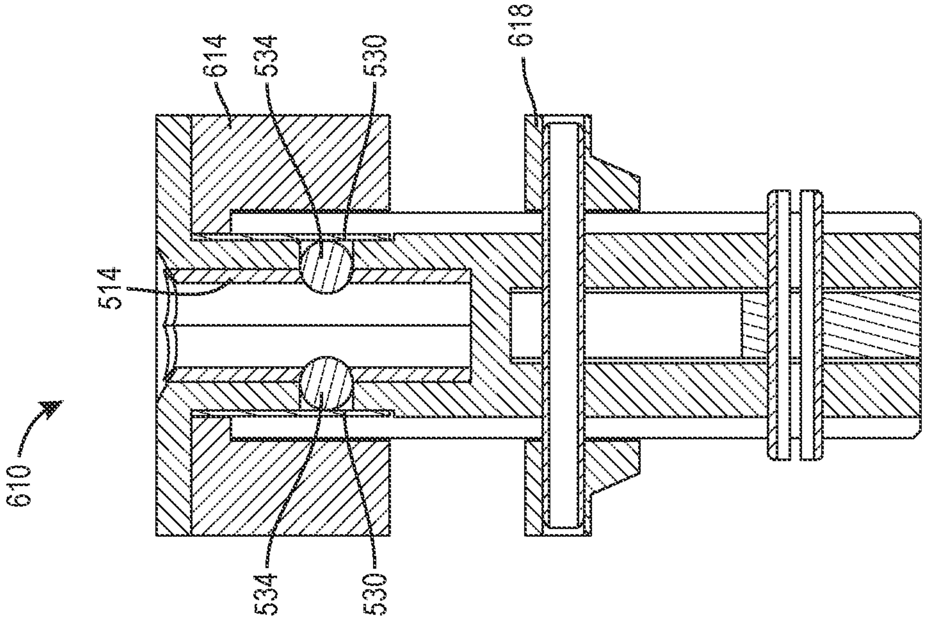
FIG. 26 is a cross-sectional view of the release mechanism of FIG. 23.

FIGS. 24-26 illustrate another release mechanism 610 for use with the drive coupling mechanism 510. The release mechanism 610 is similar to the release mechanism 518 discussed above with like features being represented with like reference numbers. The release mechanism 610 includes a slidable shuttle 614, a stop ring 618 that limits the axial movement of the shuttle 614, and resilient locking members 622 that are supported by the stop ring 618 against opposing sides of the body 414 of the drive coupling mechanism 510. Each of the locking members 622 includes a first end 626 that is radially moveable relative to a second end 630, a first protrusion 634 adjacent the first end 626 and a second protrusion 638 positioned between the first protrusion 634 and the second end 630. The shuttle 614 is axially moveable between a first unlocked position (FIG. 26) and a second locked position.

In the unlocked position, the locking spheres 534 may be disengaged from the groove 738 of the shank 734 facilitating removal or insertion of the shank 734 from the hex insert 514. In the unlocked position, when the shank 734 is inserted into the insert 514, the locking spheres 534 are allowed to move radially outwards due to the shuttle 614 not being positioned right behind the locking spheres 534. Further, when in the unlocked position, the first protrusions 634 extend through openings 642 in the shuttle 614 to secure the shuttle 614 in the unlocked position. In the locked position, the shuttle 614 is positioned directly behind the locking spheres 534, inhibiting the locking spheres 534 from moving radially outwards thus allowing the locking spheres 534 to engage the groove 738 of the shank 734 to secure the shank 734 within the hex insert 514. In addition, when in the locked position, the second protrusions 634 extend through the openings 642 in the shuttle 614 to secure the shuttle 614 in the locked position. To move the shuttle 614 between the unlocked and locked positions, a user may push either the first or second protrusions 634, 638 radially inwards, which causes the protrusions 634, 638 to disengage from the openings 642 in the shuttle 614. A user may then move the shuttle 614 axially between the unlocked or locked positions. To secure the shuttle 614 in either the unlocked or locked position, a user may release the respective protrusions 634, 638, allowing the protrusions 634, 638 to engage the openings 642 in the shuttle 614. In some embodiments, the shuttle 614, the stop ring 618 and the locking members 622 may be made from a plastic material in order to lower manufacturing costs.

Figure 27:
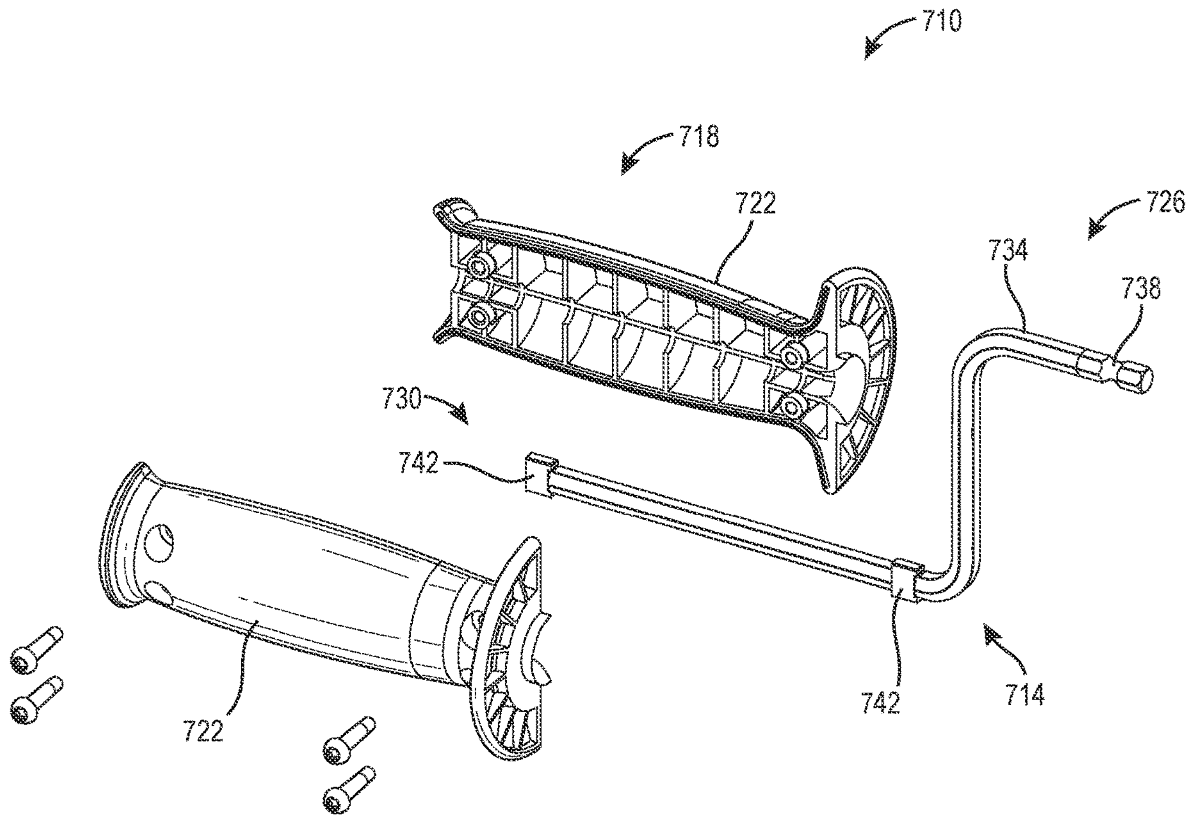
FIG. 27 is an exploded view of a crank handle of the closet auger of FIG. 12.

With reference to FIG. 27, the crank handle 710 is similar to the crank handle 78 with like features being represented by like reference numbers. The crank handle 710 includes a crank arm 714 and a handle 718. The handle 718 includes two clamshell halves 722 that when coupled together define a grip for a user to rotate the crank handle 710. The clamshell halves 722 may be coupled together using fasteners (e.g., screws, rivets, etc.) or the like. The crank arm 714 includes a first end 726 and a second end 730 opposite the first end 726. The crank arm 714 is generally double L-shaped between the first and second ends 726, 730. The first end 726 defines the shank 734 with the groove 738 to receive the locking spheres 534 to couple the crank handle 710 to one of the drive coupling mechanism 410. The second end 730 includes two swaged sections 742 that are spaced apart a distance. In the illustrated embodiment, the spacing between the swaged sections 742 is generally the same as the lengths of the clamshell halves 722. As such, one swaged section 742 is positioned adjacent each end of the clamshell halves 722 when assembled. The swaged sections 742 inhibit axial movement of the handle 718 when the handle 718 is coupled to the crank arm 714. Providing the crank arm 714 with one or more swaged sections 742 eliminates the need for extra components such as washers or nut caps to secure the handle 718 to the crank arm 714.

In some embodiments, the crank arm 714 may only include one swaged section 742. For example, the crank arm 714 may only include the swaged section 742 adjacent the second end 730, and the other, intermediate swaged section 742 may be omitted. In such embodiments, the crank handle 710 may include a washer at the swaged section 742 for added strength when a user pulls on the crank handle 710 when pulling out of a clog.

Various features of the invention are set forth in the following claims.

What is claimed is:

1. A closet auger comprising:

a casing member extending along an axis;

a drive member telescopically received in the casing member and moveable between an extended position and a retracted position relative to the casing member along the axis, the drive member including a first end and a second end opposite the first end, the first end having an integrally formed expanded portion that expands away from a remainder of the drive member in a direction perpendicular to the axis, the expanded portion configured to contact the casing member and limit the axial movement of the drive member; and a flexible cable removably connectable to the drive member.

2. The closet auger of claim 1, wherein the flexible cable includes a sleeve having a cavity and an opening.

3. The closet auger of claim 2, further comprising a resilient member including a detent, the detent configured to protrude through the opening to connect the flexible cable to the drive member.

4. The closet auger of claim 3, wherein the detent is integral with the resilient member.

5. The closet auger of claim 3, wherein the resilient member is a spring push button detent.

6. The closet auger of claim 2, wherein the sleeve is slidingly received within an interior of the drive member.

7. The closet auger of claim 6, wherein the sleeve has a cross-section that corresponds to the cross-section of the interior of the drive member to transfer torque from the drive member to the flexible cable.

8. The closet auger of claim 6, wherein the sleeve has a polygonal cross-section, and wherein the interior of the drive member has a polygonal cross-section.

9. The closet auger of claim 1, wherein the expanded portion is frustoconical-shaped.

10. A closet auger comprising:

a casing member extending along an axis;

a drive member telescopically received in the casing member and moveable between an extended position and a retracted position relative to the casing member along the axis;

a flexible cable removably connectable to the drive member;

a drive unit to rotationally drive the drive member; and a drive coupling mechanism to couple the drive member to the drive unit, the drive coupling mechanism including, a body defining a first end and a second end opposite the first end, the first end defining a bore configured to receive a shank of the drive unit, the body made from a first material, and an adapter including an inner bore that receives the second end of the body, the adapter made from a second material that is different from the first material.

11. The closet auger of claim 10, wherein the first material is metal, and wherein the second material is plastic.

12. The closet auger of claim 10, wherein the body includes a first flange between the first and second ends, and wherein the adapter includes a second flange that engages the first flange.

13. The closet auger of claim 10, wherein a cross-section of the second end of the body is similar to a cross-section of the bore.

14. The closet auger of claim 13, wherein the adapter defines an outer cross-section that is square.

15. The closet auger of claim 10, wherein the second end of the body defines a circular cross-section, and wherein the bore defines a circular cross-section.

16. The closet auger of claim 10, wherein the second end of the body includes a first flat surface, and wherein the bore defines a second flat surface that corresponds to the first flat surface.

17. A closet auger comprising:

a casing member extending along an axis;

a drive member telescopically received in the casing member and moveable between an extended position and a retracted position relative to the casing member along the axis;

a flexible cable removably connectable to the drive member; and a crank handle coupled to the drive member to transfer torque to the drive member, the crank handle including, a crank arm including a first end and a second end opposite the first end, the first end including a shank, the second end including a swaged section, and a handle coupled to the second end of the crank arm, the handle engaging the swaged section to inhibit axial movement of the handle.

18. The closet auger of claim 17, wherein the handle includes two clamshell halves that define a grip for a user to rotate the crank handle.

19. The closet auger of claim 17, wherein the crank arm is generally double L-shaped between the first and second ends.

20. The closet auger of claim 17, wherein the shank includes a groove configured to receive a locking sphere.

21. The closet auger of claim 17, wherein the swaged section is a first swaged section, and wherein the second end of the crank arm includes a second swaged section spaced apart from the first swaged section.

* * * * *